(12) United States Patent
Kamoda et al.

(10) Patent No.: US 6,343,880 B1
(45) Date of Patent: Feb. 5, 2002

(54) CAMERA LOADABLE WITH PHOTO FILM CASSETTE

(75) Inventors: Takashi Kamoda; Kazuhiko Onda, both of Saitama (JP)

(73) Assignee: Fuji Photo Optical Ltd., Saitama (JP)

( * ) Notice: Subject to any disclaimer, the term of this patent is extended or adjusted under 35 U.S.C. 154(b) by 33 days.

(21) Appl. No.: 09/586,995

(22) Filed: Jun. 5, 2000

(30) Foreign Application Priority Data

Jun. 3, 1999 (JP) .......................................... 11-157120

(51) Int. Cl.⁷ ................................................ G03B 1/00
(52) U.S. Cl. ........................ 396/411; 396/413; 396/418
(58) Field of Search ................ 396/411, 413, 396/418, 387

(56) References Cited

U.S. PATENT DOCUMENTS

| | | | |
|---|---|---|---|
| 5,373,336 A | * 12/1994 | Sugita | 396/439 |
| 5,835,805 A | 11/1998 | Izaki et al. | 396/411 |
| 5,911,088 A | * 6/1999 | Higashihara | 396/387 |

* cited by examiner

*Primary Examiner*—David M. Gray
*Assistant Examiner*—Rochelle Blackman
(74) *Attorney, Agent, or Firm*—Young & Thompson

(57) ABSTRACT

A camera has a spool drive shaft disposed to project from an inside of a cassette holder chamber, connected with a spool of a photo film cassette coaxially, to feed a photo film from a cassette, and to wind the photo film back into the cassette. A sun and planet gear mechanism includes a sun gear for rotating in a first direction in response to forward rotation in a first direction in response to forward rotation of a motor, and for rotating in a second direction in response to the backward rotation of the motor. A feeding planet gear and returning planet gear are meshed with the sun gear. Two feeding transmission gears are meshed with the feeding planet gear for rotating in the first direction in response to forward rotation. A returning transmission gear is meshed with the returning planet gear for rotating in the first direction in response to backward rotation, to cause a spool drive shaft to rotate in the winding direction. The two feeding transmission gears and returning transmission gear are disposed coaxially with one another.

14 Claims, 9 Drawing Sheets

CAMERA LOADABLE WITH PHOTO FILM CASSETTE

BACKGROUND OF THE INVENTION

1. Field of the Invention

The present invention relates to a camera loadable with a photo film cassette. More particularly, the present invention relates to a camera with a photo film advancing mechanism having a small size and feeding and returning photo film of a photo film cassette.

2. Description Related to the Prior Art

The IX240 type of photo film cassette is known in the field of photosensitive material. The photo film cassette has photo film which is entirely contained in a cassette shell when unexposed. A spool in the photo film cassette is rotated in a photo film unwinding direction so as to advance a leader end of the photo film to the outside of the cassette shell. There are various types of cameras for use with the IX240 type. The cassette shell in the photo film cassette is formed from plastic material with lightshielding opacity.

JP-A 9-281574 (corresponding to U.S. Pat. No. 5,835,805) discloses an example of photo film advancing mechanism in the camera of a type for use with the IX240 type of the photo film cassette. The photo film advancing mechanism includes a spool drive shaft and take-up spool. The spool drive shaft is engageable with a spool in the photo film cassette. The take-up spool winds up the photo film fed from the photo film cassette. The spool drive shaft is rotatable in the photo film unwinding direction and a winding direction by changing over a motor between two rotational directions. Rotations in the photo film unwinding direction feed the photo film from the cassette shell. Rotations in the winding direction return the photo film into the cassette shell. The take-up spool rotates in a photo film take-up direction to wind the photo film.

A rotational speed of the take-up spool at its peripheral surface is predetermined higher than a rotational speed of the spool drive shaft in the unwinding direction so as to capture a leader end of the photo film reliably. When the leader end of the photo film is taken up by the take-up spool, accidental tension may be applied by the take-up spool to the photo film due to inequality in the rotational speed of the spool drive shaft and take-up spool. To prevent such an accident, a clutch mechanism is added to the photo film advancing mechanism for allowing the spool drive shaft to rotate freely upon pulling of the take-up spool for the photo film. Also, a sun and planet gear unit is incorporated for changing over transmission of motor rotation between the spool drive shaft and take-up spool at the time of photo film feeding and returning.

There are suggestions of reducing a size of the camera to make much use of the small size of the IX240 type of the photo film cassette that is smaller than 135 type. However, the photo film advancing mechanism of the prior art has the sun and planet gear unit and various transmission gears meshed with the sun and planet gear unit either of which includes numerous parts juxtaposed horizontally in a space inside a lower face of the camera. This conventional structure is inconsistent to reduction of the size of the camera.

If the camera has a small size, it is difficult or impossible to keep spaces at outer faces of the camera for lids, doors or portions of access to inner chambers in the camera. In the known type of the camera for use with the IX240 type of the photo film cassette, there is an unused space inside a lower face of the camera. It might be conceivable to dispose a battery chamber and battery chamber lid in such a space. However, there is no known construction enabling this construction, the camera accommodates a train of plural speed-reducing gears in the space inside the lower face for connection between the take-up spool and spool drive shaft.

SUMMARY OF THE INVENTION

In view of the foregoing problems, an object of the present invention is to provide a camera having a photo film advancing mechanism and in which spaces inside a camera body can be saved structurally.

In order to achieve the above and other objects and advantages of this invention, a camera is loadable with a photo film cassette including a cassette shell, a spool contained in the cassette shell in a rotatable manner, and a photo film wound about the spool in a roll form. In the camera, a cassette holder chamber contains the cassette shell. A roll chamber is provided, into which the photo film is advanced from the cassette shell. A spool drive shaft is disposed to project from an inside of the cassette holder chamber, connected with the spool coaxially, for rotating in an unwinding direction, to feed the photo film from the cassette shell, and for rotating in a winding direction, to wind the photo film back to the spool. A take-up spool is disposed to project from an inside of the roll chamber, for rotating in a take-up direction, to take up the photo film from the cassette shell. A motor makes a forward rotation to feed the photo film, and a backward rotation to return the photo film. A sun and planet gear mechanism includes a sun gear for rotating in a first direction in response to the motor forward rotation, and for rotating in a second direction in response to the motor backward rotation. A feeding planet gear and a returning planet gear are meshed with the sun gear. An arm supports and keeps the sun gear and the feeding and returning planet gears meshed with one another in a rotatable manner. A first feeding transmission gear is meshed with the feeding planet gear revolved about the sun gear, for rotating in the first direction in response to the motor forward rotation, to cause the spool drive shaft to rotate in the unwinding direction. A second feeding transmission gear is meshed with the feeding planet gear revolved about the sun gear, for rotating in the first direction in response to the motor forward rotation, to cause the take-up spool to rotate in the take-up direction. A returning transmission gear is meshed with the returning planet gear revolved about the sun gear, for rotating in the second direction in response to the motor backward rotation, to cause the spool drive shaft to rotate in the winding direction. The first and second feeding transmission gears and the returning transmission gear are disposed coaxially with one another.

Furthermore, a clutch mechanism selectively sets connected and disconnected states between the first feeding transmission gear and the spool drive shaft, and during an initial step in the motor forward rotation, the clutch mechanism setting the connected state, and after the initial step in the motor forward rotation, the spool drive shaft being rotated at a higher speed by feeding of the photo film, the clutch mechanism setting the disconnected state to free the spool drive shaft from the first feeding transmission gear.

The returning transmission gear is connected with the first feeding transmission gear by setting of the connected state in the clutch mechanism, rotated by the first feeding transmission gear, for rotating the spool drive shaft.

Furthermore, a timing belt is moved round by the returning transmission gear, for rotating the spool drive shaft. A camera incorporated part is disposed along the timing belt.

At least one tension roller for flexing the timing belt to prevent interference with the camera incorporated part.

The camera incorporated part is a battery or an electronic flash main capacitor having a cylindrical shape and oriented to extend horizontally.

The clutch mechanism is disposed coaxially with the first and second feeding transmission gears and the returning transmission gear.

The clutch mechanism includes a first group of plural ratchet claws arranged in the first feeding transmission gear to project toward the returning transmission gear, each of the ratchet claws having a first erect face and a first inclined face. A second group of plural ratchet claws is arranged in the returning transmission gear to project toward the first feeding transmission gear, each of the ratchet claws having a second erect face and a second inclined face. The first and second erect faces become engaged with each other upon rotation of the first feeding transmission gear in the first direction, for rotating the returning transmission gear in the first direction, and the first and second inclined faces slip from each other, for allowing the returning transmission gear to rotate in the first direction relative to the first feeding transmission gear.

Furthermore, a coil spring pushes the first feeding transmission gear toward the returning transmission gear.

The timing belt is disposed under the roll chamber and the cassette holder chamber, and extends therebetween. The returning transmission gear is disposed under the roll chamber. Furthermore, a driven timing gear is disposed under the cassette holder chamber, meshed with the timing belt, and rotated thereby.

The first and second feeding transmission gears have a diameter equal therebetween. The second feeding transmission gear is disposed above the first feeding transmission gear, and the returning transmission gear is disposed under the first feeding transmission gear.

The arm is disposed under the sun gear and the feeding and returning planet gears, and includes a first support portion for supporting the sun gear and the returning planet gear. A second support portion supports the feeding planet gear. A rise portion has lower and upper ends, the lower end having the first support portion projecting therefrom, the upper end having the second support portion projecting therefrom, for keeping the feeding planet gear positioned higher than the returning planet gear.

The spool drive shaft is disposed in an upper wall of the cassette holder chamber. Furthermore, a transmission mechanism is extended along a vertical wall of the cassette holder chamber, for transmitting rotation of the second timing gear to the spool drive shaft.

Furthermore, a driving timing gear portion is formed with a lower face of the returning transmission gear, meshed with the timing belt, for driving the timing belt.

The photo film cassette is IX240 type.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
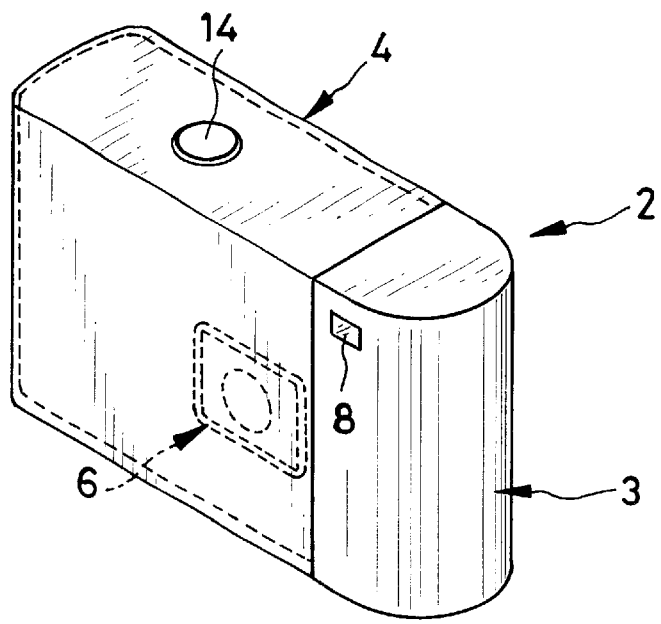
FIG. 1 is a perspective illustrating a camera of the present invention.
Figure 2:
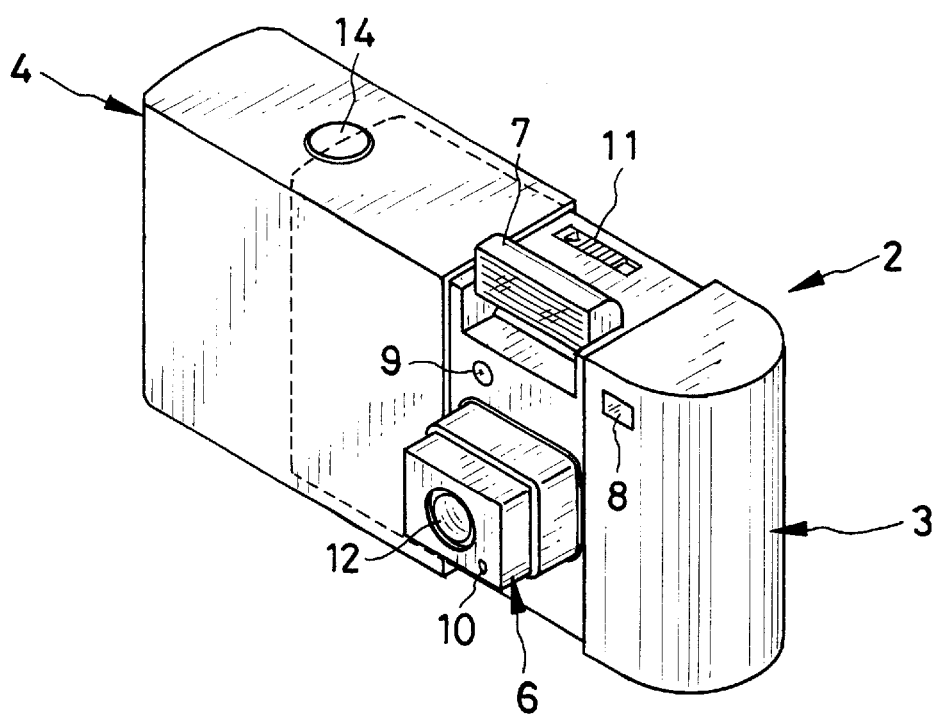
FIG. 2 is a perspective illustrating the camera but in an exposure position.

In FIGS. 1 and 2, a camera 2 of the present invention is illustrated, in respectively a folded position and exposure position. The camera 2 includes a camera body 3 and slidable cover 4. The camera body 3 is in a rectangular quadrilateral shape, and has various mechanisms and parts incorporated therein. The slidable cover 4 is in a box shape, and slidable on the camera body 3 to cover the same. The slidable cover 4 is produced from lightweight material with high strength. Examples of the material are plastic, aluminum, titanium and the like.

The camera 2 comes to have a compact size by containing approximately the entirety of the camera body 3 in the slidable cover 4 when not used. The camera 2 has high portability as it does not have considerable projections or recesses externally when folded. When the camera 2 is used, the camera body 3 is pulled from the slidable cover 4, which operates as a grip to be manually held.

Figure 3:
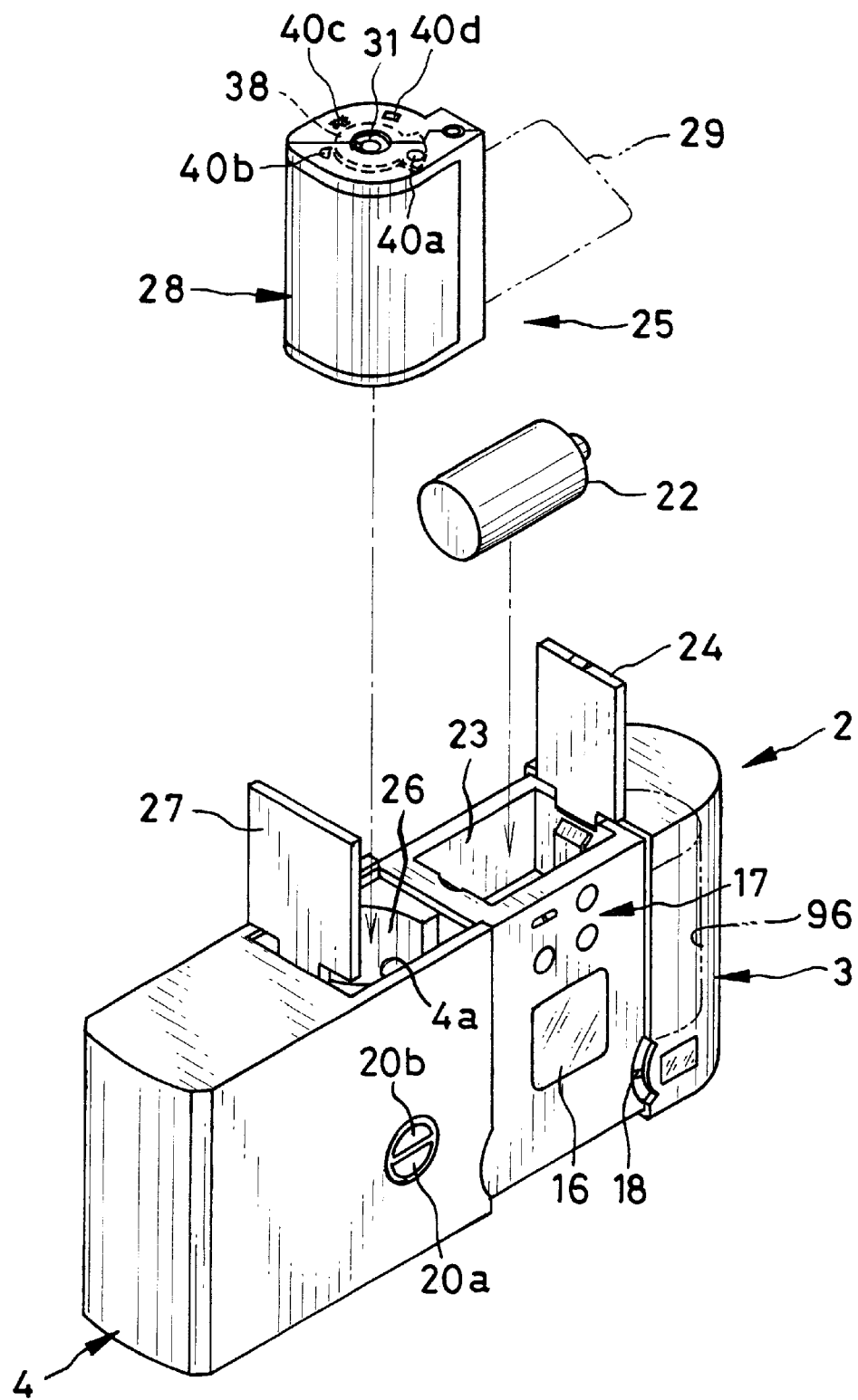
FIG. 3 is a perspective illustrating the camera in a cassette exchange position with a photo film cassette.

The slidable cover 4 is set in four positions with reference to the camera body 3, which include the folded position of FIG. 1, the exposure position of FIG. 2, a cassette exchange position of FIG. 3, and a locked position that is not shown. Also, the slidable cover 4 operates as an operable member for turning on a power switch for the camera 2, and when slid in the exposure position, the camera 2 is powered on, and when slid to positions other than the exposure position, the camera 2 is powered off.

Front and upper faces of the camera body 3 have a lens barrel 6, a flash emitter 7, a viewfinder objective window 8, a rangefinding window 9 for projecting and receiving light, a photometric light receiving window 10, an unlocking pushbutton 11, and the like. The lens barrel 6 accommodates a zoom optical system including a taking lens 12. When the camera 2 is not powered, the lens barrel 6 is collapsed in the camera body 3. When the camera 2 is powered on, the lens barrel 6 is advanced. The flash emitter 7 is pivotally movable between an uncovered position popped up from the camera body 3 and a contained position contained in the camera body 3. Upon pulling of the camera body 3 from the slidable cover 4, the flash emitter 7 is moved to the uncovered position by a spring. The unlocking pushbutton 11 unlocks the slidable cover 4 from the exposure position at the time of moving the slidable cover 4 from the exposure position to the cassette exchange position.

There is a shutter switch that is not shown, which is disposed in a top of the camera body 3 but in a position hidden by the slidable cover 4. The shutter switch is a pushbutton type, and when depressed only halfway, causes rangefinding and photometric operations of the rangefinding and photometric devices in the camera body 3, and when depressed fully, releases the shutter unit. A shutter release button 14 is located in a top of the slidable cover 4, becomes opposed to the shutter switch when the slidable cover 4 slides to the exposure position. The shutter switch is operated by means of the shutter release button 14.

In FIG. 3, the slidable cover 4 is pulled to the cassette exchange position where the slidable cover 4 is pulled further from the exposure position. The rear of the camera body 3 is provided with a liquid crystal display panel 16, operation switches 17 and a size selector switch 18. The liquid crystal display panel 16 displays various kinds of information of the camera 2. The operation switches 17 are adapted to inputting various settings of the camera 2. The size selector switch 18 is used to designate a desired one of image sizes, which include Normal, Wide and Panoramic sizes and the like. The operation switches 17 include a partially rewinding switch with which the photo film can be wound back even after partial exposures.

Zoom buttons 20a and 20b of a semi-circular shape are disposed in the rear of the slidable cover 4. When the slidable cover 4 slides to the exposure position, the zoom buttons 20a and 20b become opposed to two zoom switches (not shown) which are disposed in the rear of the camera body 3 and covered by the slidable cover 4. The zoom switches are operated by means of the zoom buttons 20a and 20b, and change a zoom magnification in the zoom optical system in the lens barrel 6.

A battery chamber 23 is formed in the bottom of the camera body 3 for containing a battery 22 as a power source of the camera 2. A battery chamber lid 24 of a plate shape closes the battery chamber 23 openably, and is pivotally movable from a lower face of the camera body 3. A cassette holder chamber 26 is formed in the camera body 3 on a side covered by the slidable cover 4, and is loadable with a photo film cassette 25. A lower lid 27 of a plate shape closes a lower opening of the cassette holder chamber 26 openably, and is pivotally movable from the lower face of the camera body 3. A roll chamber 96 is formed in the camera body 3 on a side farther from the slidable cover 4 with reference to the lens barrel 6, and receives a roll of photo film 29 drawn from a cassette shell 28 of the photo film cassette 25.

A large recess 4a is formed in the bottom of the slidable cover 4. The recess 4a uncovers the lower lid 27 fully when the slidable cover 4 is slid to the cassette exchange position. When the slidable cover 4 is in positions different from the cassette exchange position, the slidable cover 4 covers the lower lid 27 partially to keep the lower lid 27 from opening accidentally. As the recess 4a does not close the battery chamber lid 24 even when the slidable cover 4 is in the folded position. So a battery in the camera 2 can be exchanged even in the folded position.

Figure 4:
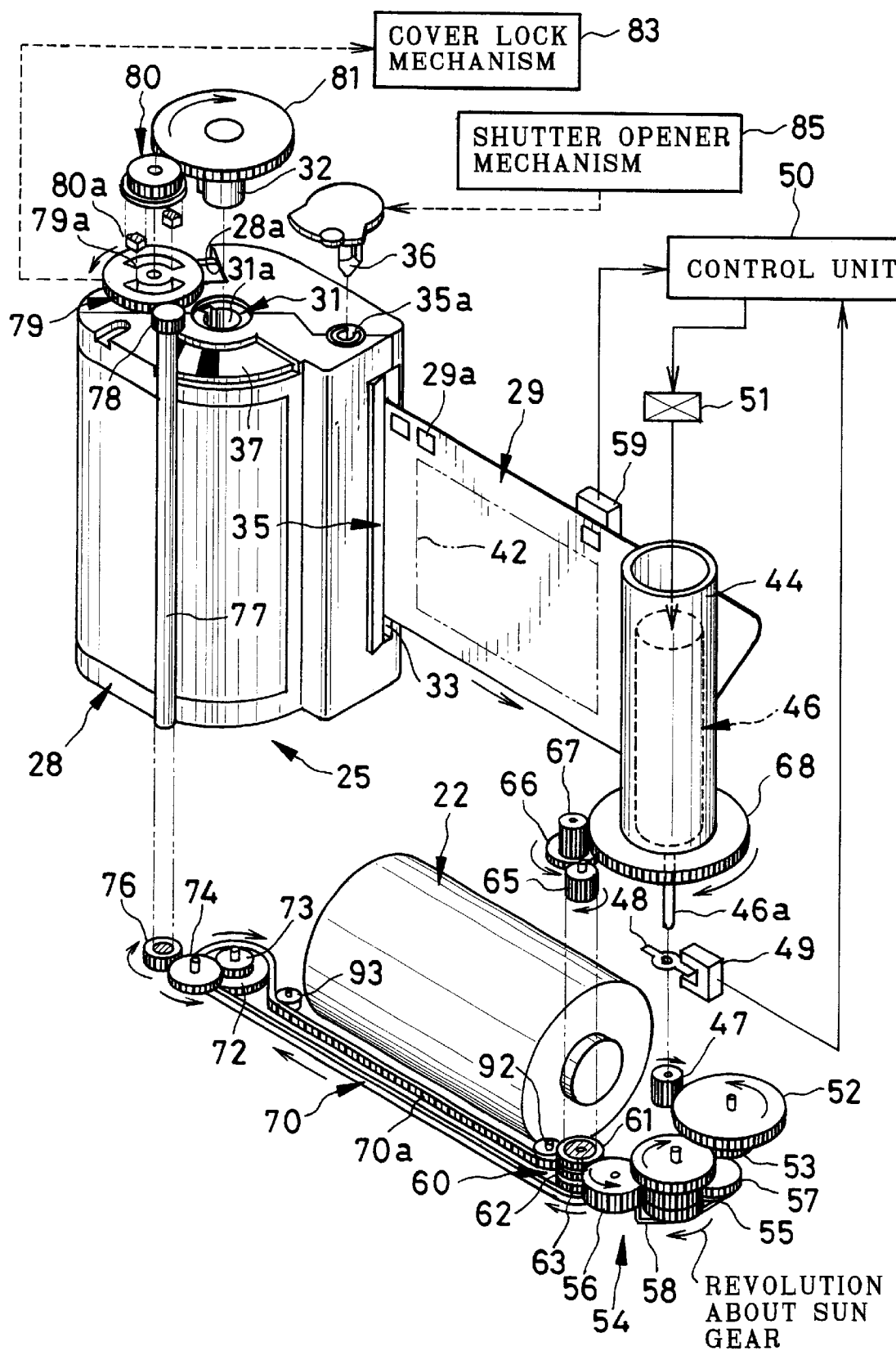
FIG. 4 is an exploded perspective illustrating a photo film advancing mechanism in the camera with photo film.

The photo film cassette 25 includes the cassette shell 28 and photo film 29 contained in the same. A spool 31 is contained in the cassette shell 28 in a rotatable manner for winding the photo film 29. In FIG. 4, two ends of the spool 31 are provided with an axial hole 31a for engagement with a spool drive shaft 32 in the camera 2. The axial hole 31a is uncovered through each of end faces of the cassette shell 28. Also, a photo film advancing mechanism is incorporated in the cassette shell 28 for advancing a leader end of the photo film 29 to the outside of a photo film passageway 33 in response to rotation of the spool 31 in an unwinding direction.

A light-shielding shutter 35 is disposed in a position interior from the passageway 33 in the cassette shell 28, has a long shape, and opens/closes the passageway 33. Two ends of the light-shielding shutter 35 are provided with an axial hole 35a for engagement with a shutter drive shaft 36 in the camera 2. The axial hole 35a is uncovered through each of end faces of the cassette shell 28.

A data disk 37 and indicator plate 38 are accommodated in the cassette shell 28 and are rotatable with the spool 31. The data disk 37 is an circular plate and fixed to an end of the spool 31, and has a bar code for representing data of the type, speed and frame number of the photo film 29 contained in the cassette shell 28. An opening 28a is formed in one end face of the cassette shell 28, and partially uncovers the bar code of the data disk 37, which is read by a bar code reader incorporated in the camera or other optical instruments.

The indicator plate 38 is a part constituting a using state indicator mechanism in the photo film cassette 25, and has approximately a sector shape. The indicator plate 38 is secured fixedly to the second end of the spool 31 opposite to the data disk 37. Four indicator holes 40a–40d are formed in the end face of the cassette shell 28 where the indicator plate 38 is located, and constitute the using state indicator mechanism. The indicator hole 40a has a circular shape, and represents an "unexposed" state. The indicator hole 40b has a semi-circular shape, and represents a "partially exposed" state. The indicator hole 40c has an X shape, and represents an "exposed undeveloped" state. The indicator hole 40d has a quadrilateral shape, and represents a "developed" state. When the spool 31 is controlled and stopped, the indicator plate 38 is located at one of the indicator holes 40a–40d to designate one of the four states of the photo film 29.

In the photo film 29, one surface of a support material is coated with a photosensitive emulsion layer. The remaining surface of the support material is coated with a magnetic recording layer including transparent magnetic substance. Perforations 29a are formed in the photo film 29 and arranged in correspondence with frames. In positions opposite to the perforations 29a, there are magnetic recording regions in the photo film 29 for writing and reading of various kinds of data by a magnetic recording device included in the camera, printer-and-processor, and other optical instruments.

Figure 5:
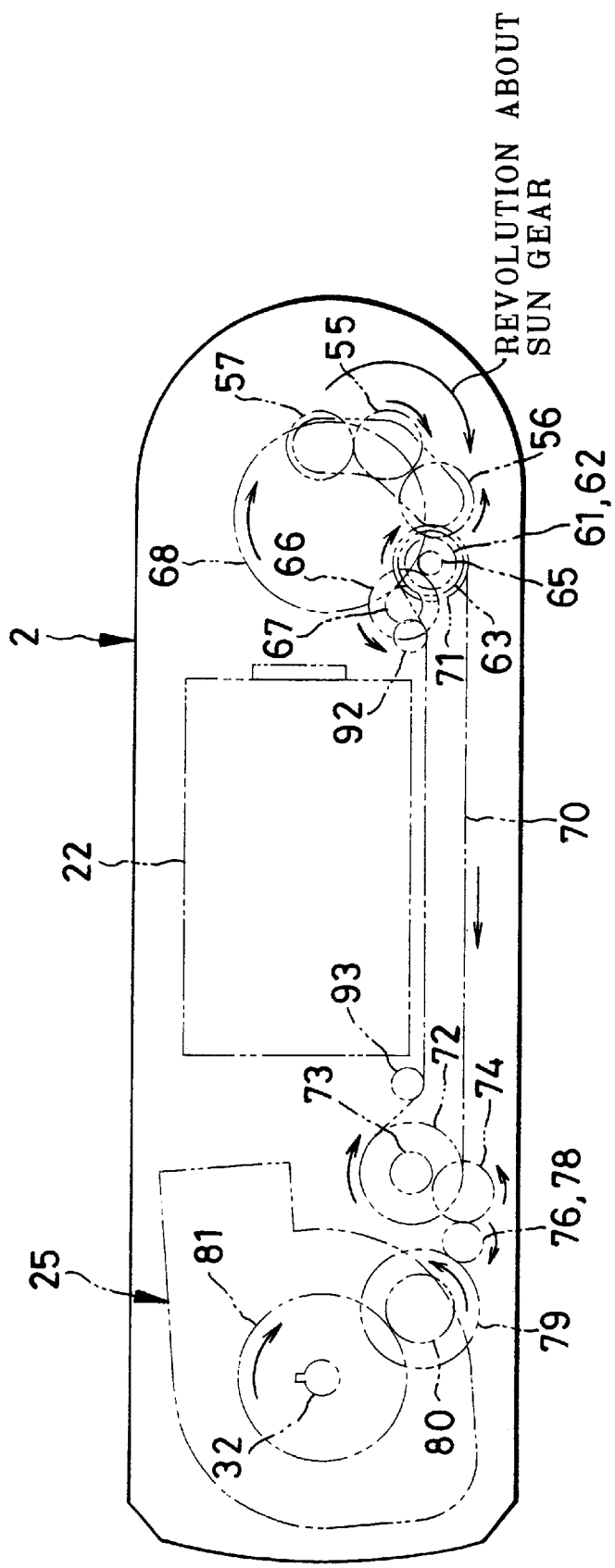
FIG. 5 is an explanatory view in plan illustrating the photo film advancing mechanism.

In FIG. 4, a photo film advancing mechanism in the camera 2 is illustrated. In FIG. 5, the photo film advancing mechanism is viewed downwards. The cassette holder chamber 26 for the photo film cassette 25 and the roll chamber 96 for a roll of the photo film 29 are disposed so that an exposure aperture 42 is disposed between those. The spool drive shaft 32 is disposed in the cassette holder chamber 26 to engage with the spool 31 in the photo film cassette 25. A take-up spool 44 is incorporated in the roll chamber 96. A rubber member or the like is attached to the outside of the take-up spool 44 to facilitate winding of the leader end of the photo film 29.

A motor 46 is contained in the take-up spool 44. A driver 51 is controlled by a control unit 50, and drives the motor 46. An output shaft 46a of the motor 46 protrudes through a lower end of the take-up spool 44. There are a pinion 47 and detection segment 48 secured to the output shaft 46a. A photo sensor 49 of a transmittance type is disposed close to the detection segment 48 for detecting rotation of the detection segment 48. A detection signal of the photo sensor 49 is input to the control unit 50 for controlling the camera 2. The control unit 50 obtains the number of rotations of the motor 46 according to the number of times of detecting the detection segment 48.

A perforation sensor 59 is disposed behind the photo film 29 to detect the perforations 29a. A detection signal from the perforation sensor 59 is input to the control unit 50.

Figure 6:
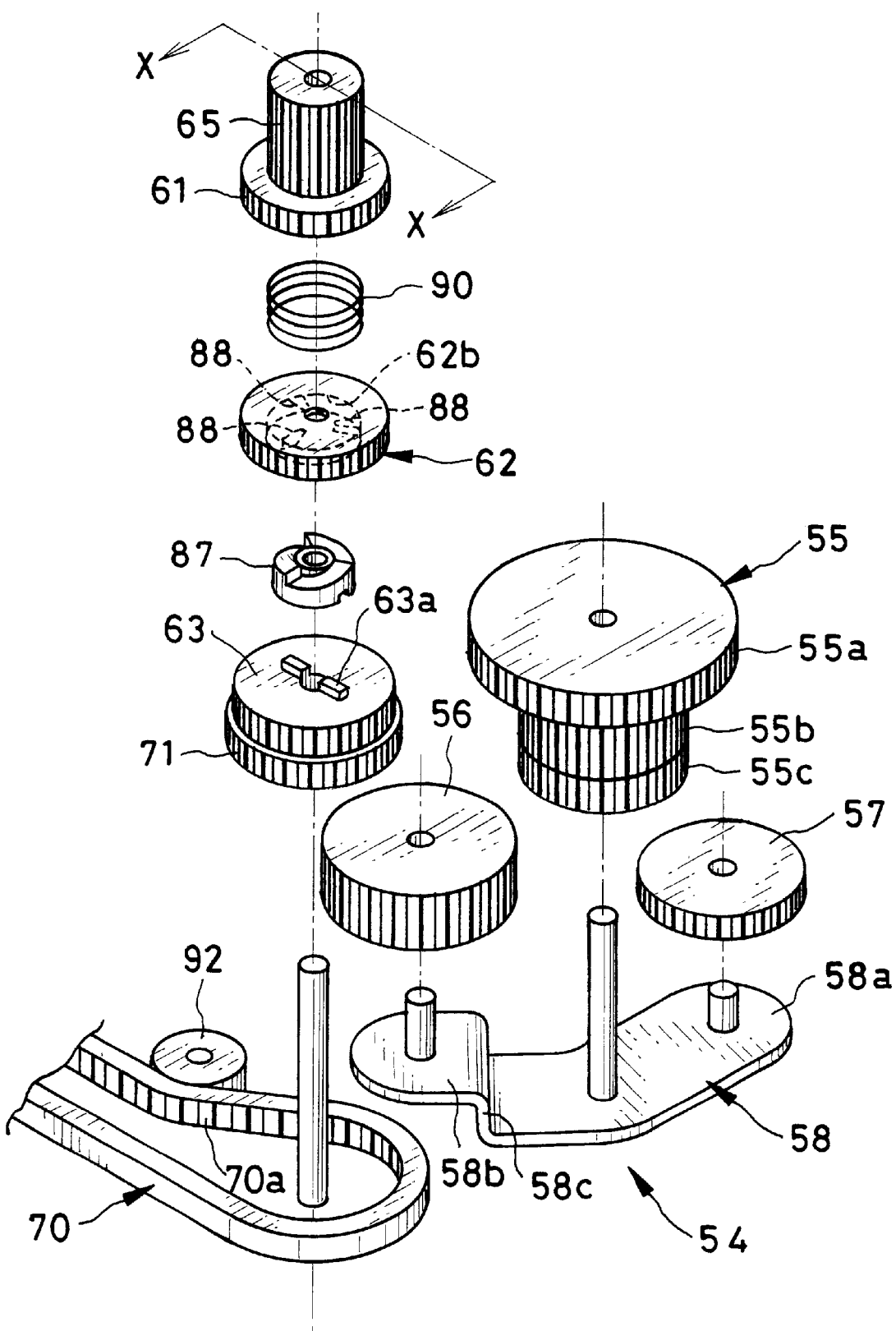
FIG. 6 is an exploded perspective illustrating a sun and planet gear mechanism and three transmission gears.

The pinion 47 is meshed with a D1 gear 52 having a great diameter. A D2 gear portion 53 is formed with the D1 gear 52. Rotation of the D2 gear portion 53 is transmitted to a sun and planet gear mechanism 54. In FIG. 6, the sun and planet gear mechanism 54 includes a sun gear 55, feeding planet gear 56, returning planet gear 57 and arm 58. The feeding and returning planet gears 56 and 57 are meshed with the sun gear 55. The arm 58 supports the feeding and returning planet gears 56 and 57, and is rotatable with respect to a rotational shaft of the sun gear 55. The arm 58 has first and second support portions 58a and 58b. The second support portion 58b to support the feeding planet gear 56 is extended from a top of a rise portion 58c to have a level higher than the first support portion 58a where the sun gear 55 and returning planet gear 57 are supported.

The sun gear 55 includes first, second and third toothed portions 55a, 55b and 55c which are different in the number and pitch of teeth. The D2 gear portion 53 is meshed with the first toothed portion 55a, and receives transmission of rotation of the motor 46. The feeding planet gear 56 is meshed with the second toothed portion 55b. The returning planet gear 57 is meshed with the third toothed portion 55c. Thus, the feeding and returning planet gears 56 and 57 are caused to rotate by the sun gear 55 at suitably reduced speeds. The feeding planet gear 56 has a greater thickness than the returning planet gear 57. Also, a thickness of the second toothed portion 55b in the sun gear 55 is sufficiently great for mesh with the feeding planet gear 56.

It is to be noted that the second and third toothed portions 55b and 55c may be the same in the number and pitch of the teeth.

When the motor 46 makes forward rotations, the sun gear 55 in the sun and planet gear mechanism 54 is caused by the D2 gear portion 53 to rotate in the clockwise direction. The feeding and returning planet gears 56 and 57 rotate in the counterclockwise direction. The teeth of the sun gear 55 itself rotate in the clockwise direction. When the motor 46 makes backward rotations, the sun gear 55 rotates in the counterclockwise direction in FIGS. 7 and 8. The rotation of the sun gear 55 causes the feeding and returning planet gears 56 and 57 to rotate about their axes in the clockwise direction. The teeth of the sun gear 55 itself rotate in the counterclockwise direction.

A transmission gear unit 60 is disposed in the vicinity of the sun and planet gear mechanism 54. In FIG. 6, the transmission gear unit 60 includes a returning transmission gear 63, first feeding transmission gear 62 and second feeding transmission gear 61 in the upward order. The transmission gears 61–63 are combined in a coaxial disposition.

Figure 7:
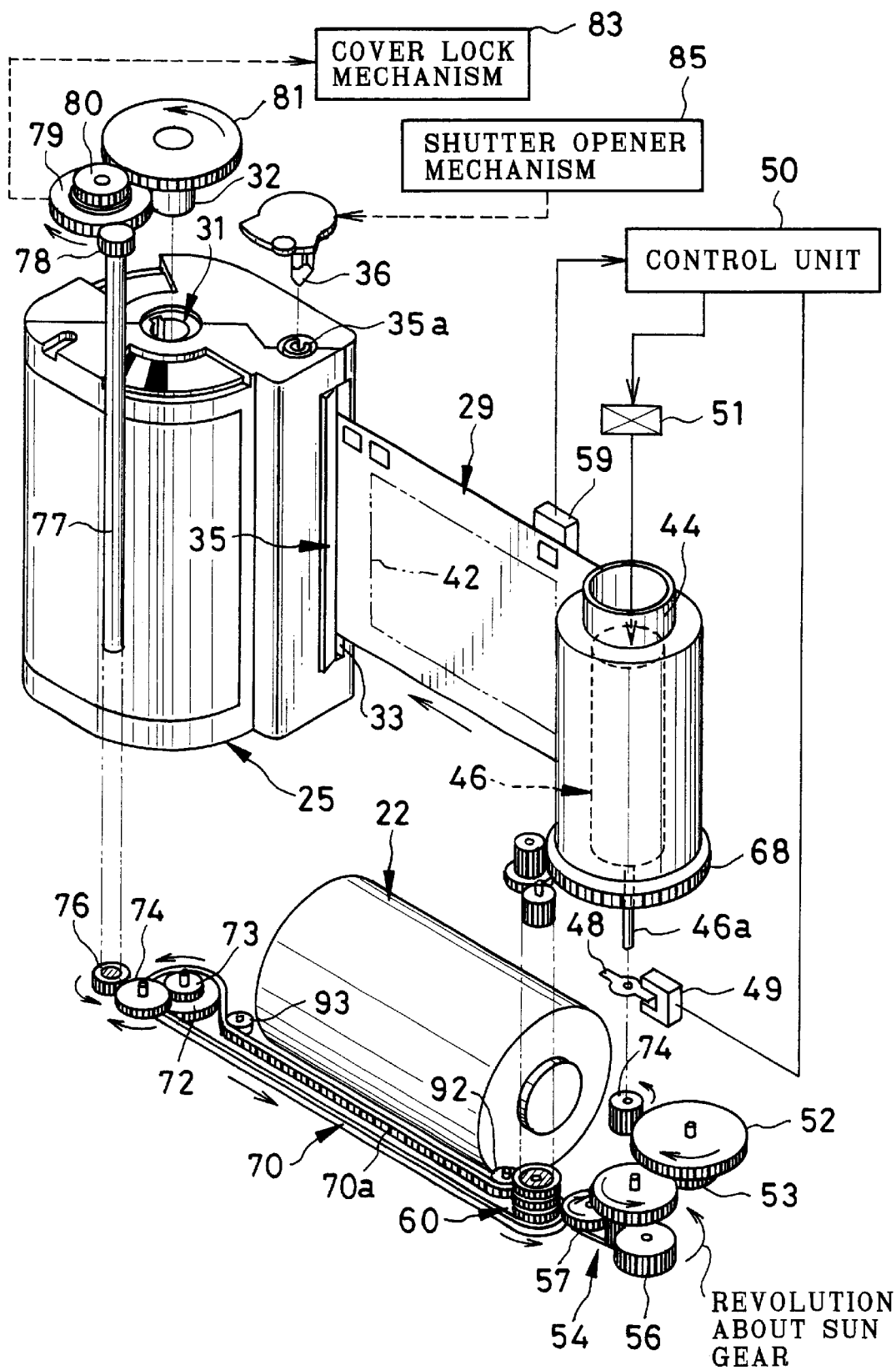
FIG. 7 is an exploded perspective illustrating the same as FIG. 4 but during return of the photo film.
Figure 8:
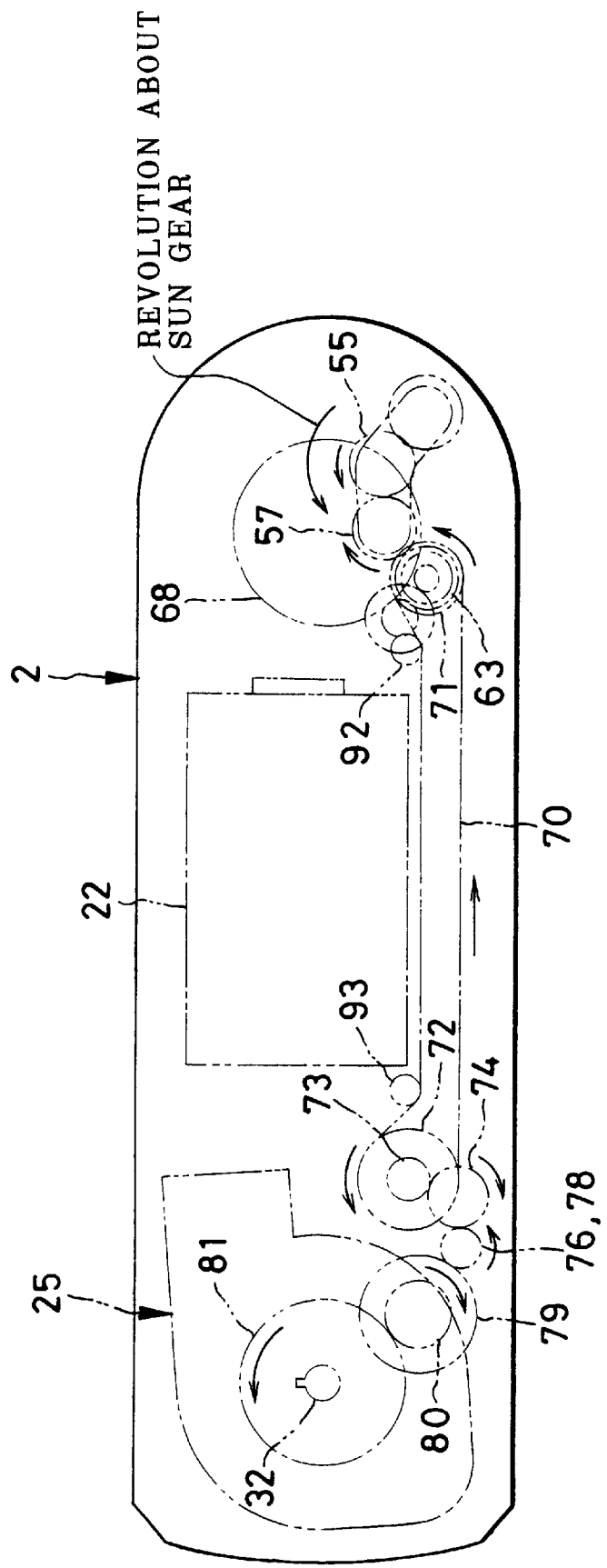
FIG. 8 is an explanatory view in plan illustrating the said as FIG. 5 but during the return of the photo film.

In FIGS. 4 and 5, the motor 46 makes forward rotations. The sun gear 55 rotates in the clockwise direction. Then the feeding planet gear 56, upon revolution about the sun gear 55, comes in mesh with the first and second transmission gears 61 and 62 at the same time. In FIGS. 7 and 8, the motor 46 makes backward rotations. The sun gear 55 rotates in the counterclockwise direction. Then the returning planet gear 57, upon revolution about the sun gear 55, comes in mesh with the returning transmission gear 63.

A D3 gear portion 65 is formed with the second feeding transmission gear 61 at a smaller diameter. A D4 gear 66 is meshed with the D3 gear portion 65. A D5 gear portion 67 is formed with the D4 gear 66. Rotation of the D3 gear portion 65 is transmitted by the D4 gear 66 and D5 gear portion 67 to a D6 gear portion 68, which is formed with the lower end of the take-up spool 44. Therefore, the take-up spool 44 is rotated in a take-up direction by rotation of the motor 46.

A driving timing gear portion 71 is formed with a lower face of the returning transmission gear 63. A timing belt 70 is meshed with the driving timing gear portion 71. The timing belt 70 has an endless looped shape and produced from rubber or other soft, flexible material. A tooth train 70a is formed on an inner surface of the timing belt 70. A driven timing gear 72 is disposed near to the cassette holder chamber 26 and close to the lower face of the camera 2, and meshed with an end portion of the timing belt 70. A D7 gear portion 73 with a small diameter is formed with the driven timing gear 72. A D8 gear 74 is meshed with the D7 gear portion 73.

A D9 gear portion 76 is meshed with the D8 gear 74, and is formed with a lower end of a transmission rod 77, which is supposed outside a vertical wall of the cassette holder chamber 26 rotatably. A D10 gear portion 78 is formed with an upper end of the transmission rod 77, and rotates together with the D9 gear portion 76. A D11 gear 79 is supported on the top of the cassette holder chamber 26, and meshed with the D10 gear portion 78. There is a D12 gear 80 disposed coaxially with the D11 gear 79. A D13 gear 81 is meshed with the D12 gear 80, and is formed with the spool drive shaft 32.

In FIG. 4, two slots 79a are formed in the D11 gear 79 and have an arc shape. Two projections 80a are formed on a lower face of the D12 gear 80. When the projections 80a are engaged with the inside of the slots 79a, rotation of the D11 gear 79 is transmitted to the D12 gear 80. The combination of the D11 gear 79 and D12 gear 80 constitutes a delayed transmission mechanism for transmitting rotation of the motor 46 to the spool drive shaft 32 with a small delay.

Rotation of the D11 gear 79 is a source of driving a cover lock mechanism 83 for locking and unlocking the slidable cover 4, as is not shown in detail in the drawings. In the camera 2, the entirety of the photo film 29 is wound into the cassette shell 28 before the spool 31 is rotated further in a winding direction, to set the using state indicator mechanism in the photo film cassette 25. After this, the D11 gear 79 is rotated in the counterclockwise direction to a small extent, so the cover lock mechanism 83 effects unlocking operation. The delayed transmission mechanism at the D11 gear 79 and D12 gear 80 keeps the using state indicator mechanism unchanged by avoiding rotation of the spool drive shaft 32 in the unwinding direction at the unlocking time.

The shutter drive shaft 36 is disposed close to the D13 gear 81 in a rotatable manner, and engaged with the light-shielding shutter 35 of the photo film cassette 25. A shutter opener mechanism 85 is driven by sliding of the slidable cover 4 between the exposure position and cassette exchange position, and rotates the shutter drive shaft 36 between positions for keeping the light-shielding shutter 35 in the open and closed positions.

In FIG. 6, a clutch mechanism is disposed between the first feeding transmission gear 62 and returning transmission gear 63, for transmitting rotation of the first feeding transmission gear 62 in its feeding direction to the returning transmission gear 63, and for setting free the spool drive shaft 32 upon application of load to the spool drive shaft 32 during feeding of the photo film. The clutch mechanism includes a clutch disk 87 with a first group of three ratchet claws, a recess 62b, and a second group of three ratchet claws 88. The clutch disk 87 is engaged with a key 63a on a top of the returning transmission gear 63, and rotates together with the same. The recess 62b is formed in a lower face of the first feeding transmission gear 62, and receives the clutch disk 87. The ratchet claws 88 are arranged on an inner surface of the recess 62b.

Figure 9:
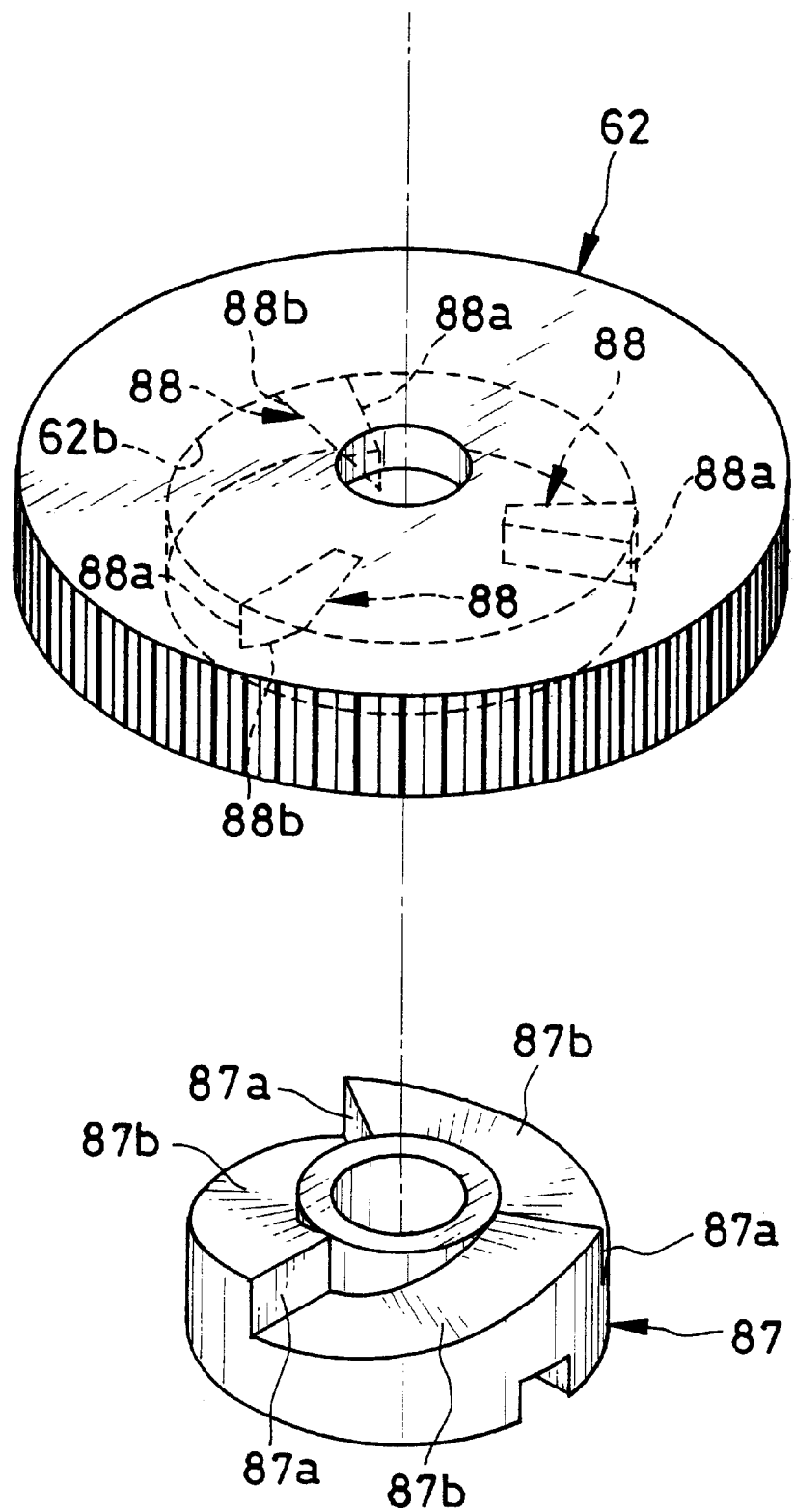
FIG. 9 is an exploded perspective illustrating a clutch mechanism for a first feeding transmission gear.
Figure 10:
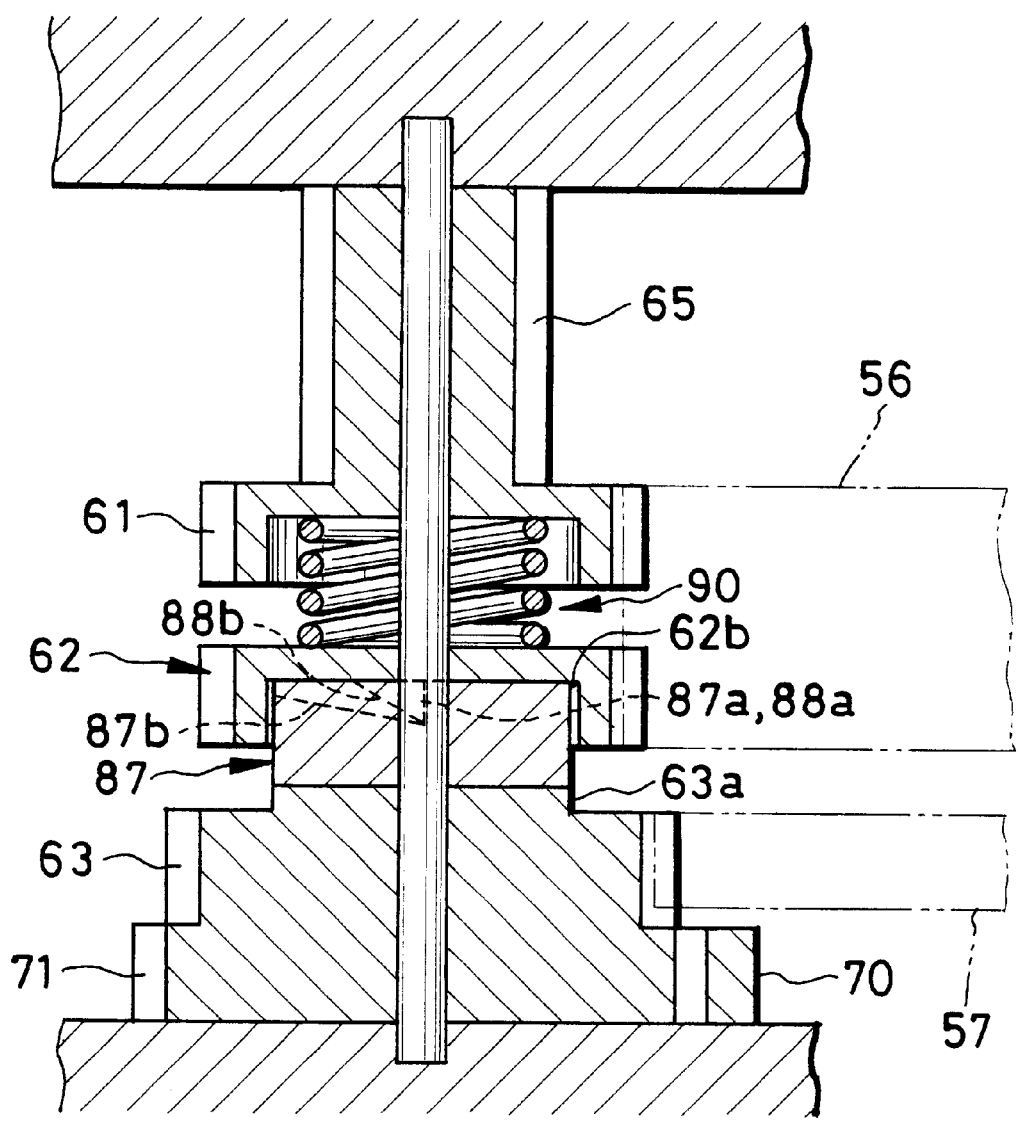
FIG. 10 is a cross section taken on line X—X in FIG. illustrating the three transmission gears.

In FIGS. 6, 9 and 10, the first feeding transmission gear 62 has the three ratchet claws 88 disposed at a rotationally regular pitch about the center of the first feeding transmission gear 62. Each of the ratchet claws 88 includes a first erect face 88a and first inclined face 88b. The first erect face 88a is perpendicular to the upper inner surface of the recess 62b. The first inclined face 88b is inclined between the end of the first erect face 88a and the upper inner surface of the recess 62b. Each of the three ratchet claws in the clutch disk 87 includes a second erect face 87a and second inclined face 87b. The second erect face 87a is erect for engagement with the first erect face 88a of the ratchet claws 88. The second inclined face 87b is inclined from the second erect face 87a for slip of the clutch disk 87 in contact with the ratchet claws 88.

A coil spring 90 is accommodated between the first and second feeding transmission gears 62 and 61, presses the first feeding transmission gear 62 toward the returning transmission gear 63, and ensures engagement of the ratchet claws 88 with the ratchet claws in the clutch disk 87.

During the photo film feeding, the first erect face 88a in the ratchet claws 88 in the clutch mechanism is engaged with the second erect face 87a in the clutch disk 87. The clutch mechanism transmits rotation of the first feeding transmission gear 62 to the returning transmission gear 63. Thus, the timing belt 70 causes the spool drive shaft 32 to rotate in the unwinding direction.

Gear ratios between the various gears are so predetermined as to set a rotational speed of the take-up spool 44 higher than that of the spool drive shaft 32, for the purpose of preventing looseness in the photo film 29 between the spool drive shaft 32 and take-up spool 44 during the photo film feeding. When the photo film 29 from the cassette shell 28 is wound about the take-up spool 44, the photo film 29 is pulled by the take-up spool 44 to apply high load to the spool drive shaft 32. In the clutch mechanism, a rotational speed of the clutch disk 87 becomes higher than that of the first feeding transmission gear 62. The second inclined face 87b of the ratchet claws in the clutch disk 87 slips from the ratchet claws 88, to set free the rotation of the spool drive shaft 32.

In conventional cameras, the first and second transmission gears 61 and 62 and returning transmission gear 63 are juxtaposed horizontally. However, the camera of the present invention has the first and second transmission gears 61 and 62 and returning transmission gear 63 disposed in a coaxial manner. So it is possible that an area of the photo film advancing mechanism with reference to the lower face of the camera 2 can be considerably small. There are tension rollers 92 and 93, contacted on the timing belt 70, for flexing the same to save a space of the timing belt 70 required in the camera 2. This space makes it possible to form the battery chamber 23 with a sufficient size for containing the battery 22. The battery chamber lid 24 can be disposed safely in the bottom of the camera 2.

In FIGS. 5 and 8, the pinion 47, D1 gear 52 and D2 gear portion 53 are not shown for simplification in the depiction.

The operation of the above embodiment is described now. In FIG. 3, the camera 2 is loaded with the photo film cassette 25. At first, the slidable cover 4 is slid to the cassette exchange position from the camera body 3. The lower face of the camera 2 is directed upwards. The lower lid 27 is opened through the recess 4a of the slidable cover 4 to open the cassette holder chamber 26. The photo film cassette 25 in the unexposed or partially exposed state is inserted into the cassette holder chamber 26 by axial movement. After the loading, the lower lid 27 is closed. The slidable cover 4 is slid to the exposure position or to the unfolded position.

When the slidable cover 4 is slid from the cassette exchange position either to the exposure position of FIG. 1 or to the folded position of FIG. 2, then the shutter opener mechanism 85 of FIG. 4 operates. The shutter opener mechanism 85 causes the shutter drive shaft 36 to rotate toward the open position of the light-shielding shutter 35, the shutter drive shaft 36 being engaged with the axial hole 35a in the light-shielding shutter 35 in the cassette holder chamber 26. The passageway 33 in the cassette shell 28 is opened.

After the slidable cover 4 is slid to the exposure position or to the folded position, then the control unit 50 effects operation of reading data and detecting the using state. The control unit 50 causes the motor 46 to make backward rotations, to cause the spool 31 to rotate in the winding direction. Rotation of the motor 46 causes the D11 gear 79 to rotate. The cover lock mechanism 83 is actuated to keep the slidable cover 4 from sliding toward the cassette exchange position.

While the spool rotates, a bar code of the data disk 37 is read by the bar code reader to decode data of the photo film 29. Also, the using state of the photo film 29 is detected according to a stopped position of the spool 31. If the photo film 29 is unexposed or partially exposed, then operation of setting the photo film is effected. If the photo film 29 is exposed or developed, then the using state indication is set again to its original state. The slidable cover 4 is unlocked to remove the photo film cassette 25.

In the photo film setting process, the control unit 50 causes the motor 46 to make forward rotations. In FIGS. 4 and 5, the motor 46 causes the sun gear 55 in the sun and planet gear mechanism 54 to rotate in the clockwise direction. The feeding and returning planet gears 56 and 57 rotate about their centers in the counterclockwise direction, and revolve together with the arm 58 in the clockwise direction.

The feeding planet gear 56 having revolved in the clockwise direction comes in mesh with the first and second transmission gears 61 and 62 at the same time, and causes those to rotate in the clockwise direction. The rotation of the first feeding transmission gear 62 is transmitted to the returning transmission gear 63 by engagement of the ratchet claws 88 of the first feeding transmission gear 62 with the ratchet claws of the clutch disk 87. Thus, the rotation of the driving timing gear portion 71 formed with the returning transmission gear 63 is transmitted by the timing belt 70 to the spool drive shaft 32. The spool 31 is caused to rotate in the unwinding direction that is clockwise.

Rotation of the second feeding transmission gear 61 is transmitted by the D3 gear portion 65, D4 gear 66, and D5 gear portion 67 to the D6 gear portion 68. The take-up spool 44 rotates clockwise or in the take-up direction.

When the spool 31 is rotated in the unwinding direction by the spool drive shaft 32, the photo film 29 is advanced from the passageway 33 to the outside of the cassette shell 28. The leader end of the photo film is fed through a photo film gate in the camera toward the take-up spool 44. When the leader end of the photo film 29 comes close to the surface of the take-up spool 44, a photo film push roller disposed near to the take-up spool 44 guides the leader end and causes the same to contact the take-up spool 44. As the take-up spool 44 has started rotating in the take-up direction, the take-up spool 44 takes up the leader end instantaneously. When approximately one turn of the photo film 29 is wound about the take-up spool 44, the photo film 29 is pulled by rotation of the take-up spool 44.

A rotational speed of the take-up spool 44 is predetermined higher than that of the spool drive shaft 32. This is for the purpose of reliably capturing the leader end of the photo film 29, and preventing looseness between the spool drive shaft 32 and take-up spool 44. When the photo film 29 from the cassette shell 28 is taken up by the take-up spool 44, the photo film 29 is pulled by the take-up spool 44 with considerable force, to apply much load to the spool drive shaft 32. In the clutch mechanism, a rotational speed of the clutch disk 87 becomes higher than that of the first feeding transmission gear 62. Thus, the second inclined face 87b of the ratchet claws of the clutch disk 87 slips from the ratchet claws 88, to free rotation of the spool drive shaft 32.

In the course of the initial winding, one of the perforations 29a for a first frame reaches the perforation sensor 59. The control unit 50 stops the motor 46. Then the first frame of the cassette shell 28 is set behind the exposure aperture 42. The photo film is advanced frame by frame each time that one exposure is taken.

After exposures are taken to all frames, the motor 46 is stopped, and then starts making backward rotations. In FIGS. 7 and 8, the sun gear 55 rotates in the counterclockwise direction. The sun and planet gear mechanism 54 revolves in the counterclockwise direction. Then the returning planet gear 57 comes in mesh with the returning transmission gear 63. The spool drive shaft 32 rotates in the winding direction, to wind back the photo film 29 from the roll chamber 96 into the cassette shell 28.

Rotation of the returning transmission gear 63 is transmitted to the first feeding transmission gear 62 by the clutch disk 87 and ratchet claws 88. However, no rotation is transmitted from the first feeding transmission gear 62 to the second feeding transmission gear 61. The take-up spool 44 rotates only freely.

At a lapse of a predetermined time after the perforation sensor 59 detects passage of the leader end, the photo film is completely returned. Then an indication setting process is effected for setting the using state indication in the photo film cassette 25. In the indication setting process, the spool 31 is rotated in the winding direction, and controlled to stop in a position where a particular one of the indicator holes is designated by the indicator plate 38.

Then the D11 gear 79 is rotated at a small amount in a direction for unwinding, to unlock the slidable cover 4 from the cover lock mechanism 83. As the delayed transmission mechanism exists between the D11 gear 79 and D12 gear 80, the spool 31 makes no rotation. There is no change in the using state indicator mechanism.

In the above embodiment, the first and second transmission gears 61 and 62, clutch mechanism and returning transmission gear 63 are combined coaxially in the order listed. However, those may be combined in any other order. In the above embodiment, the space kept sufficient by flexing the timing belt 70 is utilized for containing the battery 22. However, such a space may be used for positioning a main capacitor which is cylindrical as a component of an electronic flash circuit.

It is to be noted that the driving timing gear portion 71 provided under the returning transmission gear 63 has a different diameter from that of the returning transmission gear 63. However, the driving timing gear portion 71 may have an equal diameter to that of the returning transmission gear 63. In other words, a single gear may be used, and may operate at the same for the returning transmission gear 63 and the driving timing gear portion 71.

Although the spool drive shaft 32 in the above embodiment is located at the upper wall of the cassette holder chamber 26, a camera according to the present invention may have the spool drive shaft 32 disposed at a lower wall of the cassette holder chamber 26.

In the above embodiment, the photo film cassette 25 is loaded and unloaded through a lower opening of the cassette holder chamber 26. However, a camera according to the present invention can have a rear opening through which the cassette holder chamber 26 is open to the rear and the photo film cassette 25 is loadable upon horizontal movement.

In the above embodiment, the photo film cassette 25 is the IX240 type. However, a camera according to the present invention may be for use with the photo film cassette 25 of 135 type.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera loadable with a photo film cassette including a cassette shell, a spool contained in said cassette shell in a rotatable manner, and a photo film wound about said spool in a roll form, said camera comprising:

a cassette holder chamber for containing said cassette shell;

a roll chamber into which said photo film is advanced from said cassette shell;

a spool drive shaft, disposed to project from an inside of said cassette holder chamber, connected with said spool, for rotating in an unwinding direction, to feed said photo film from said cassette shell, and for rotating in a winding direction, to wind said photo film back to said spool;

a take-up spool, disposed to project from an inside of said roll chamber, for rotating in a take-up direction, to take up said photo film from said cassette shell;

a motor for making a forward rotation to feed said photo film, and a backward rotation to return said photo film;

a sun and planet gear mechanism, including:
  (a) a sun gear for rotating in a first direction in response to said motor forward rotation, and for rotating in a second direction in response to said motor backward rotation;
  (b) a feeding planet gear and a returning planet gear, meshed with said sun gear;
  (c) an arm for supporting said sun gear and said feeding and returning planet gears in a rotatable manner, and supporting said feeding and returning planet gears in a revolvable manner;

a first feeding transmission gear, meshed with said feeding planet gear revolved about said sun gear, for transmitting rotation of said sun gear in said first direction to said spool drive shaft, to cause said spool drive shaft to rotate in said unwinding direction;

a second feeding transmission gear, meshed with said feeding planet gear revolved about said sun gear, for transmitting rotation of said sun gear in said first direction to said take-up spool, to cause said take-up spool to rotate in said take-up direction;

a returning transmission gear, meshed with said returning planet gear revolved about said sun gear, for transmitting rotation of said sun gear in said second direction to said spool drive shaft, to cause said spool drive shaft to rotate in said winding direction;

wherein said first and second feeding transmission gears and said returning transmission gear are provided coaxially with one another.

2. A camera as defined in claim 1, further comprising a clutch mechanism for selectively setting connected and disconnected states between said first feeding transmission gear and said spool drive shaft, and during an initial step in said motor forward rotation, said clutch mechanism setting said connected state, and after said initial step, said spool drive shaft being rotated at a higher speed by feeding of said take-up spool for said photo film with an end of said photo film captured by said take-up spool, then said clutch mechanism setting said disconnected state to free said spool drive shaft from said first feeding transmission gear.

3. A camera as defined in claim 2, wherein said clutch mechanism sets said connected or disconnected state between said returning transmission gear and said first feeding transmission gear, and said motor forward rotation in said connected state is transmitted to said returning transmission gear by said sun gear, said feeding planet gear and said first feeding transmission gear.

4. A camera as defined in claim 3, further comprising:
a first timing gear formed with said returning transmission gear;
a second timing gear for rotating said spool drive shaft; and
a timing belt connected between said first and second timing gears.

5. A camera as defined in claim 4, further comprising:
a camera incorporated part disposed along said timing belt; and
at least one tension roller for flexing said timing belt to prevent interference with said camera incorporated part.

6. A camera as defined in claim 5, wherein said camera incorporated part is a battery or an electronic flash main capacitor.

7. A camera as defined in claim 3, wherein said first and second feeding transmission gears and said returning transmission gear are disposed under said roll chamber, and said clutch mechanism is disposed coaxially therewith.

8. A camera as defined in claim 7, wherein said clutch mechanism includes:
a first group of plural ratchet claws arranged in said first feeding transmission gear to project toward said returning transmission gear, each of said ratchet claws having a first erect face and a first inclined face; and a second group of plural ratchet claws arranged in said returning transmission gear to project toward said first feeding transmission gear, each of said ratchet claws having a second erect face and a second inclined face, wherein said first and second erect faces become engaged with each other upon rotation of said first feeding transmission gear in said first direction, for rotating said returning transmission gear in said first direction, and said first and second inclined faces slip from each other, for allowing said returning transmission gear to rotate in said first direction relative to said first feeding transmission gear.

9. A camera as defined in claim 8, further comprising a coil spring for pushing said first feeding transmission gear toward said returning transmission gear.

10. A camera as defined in claim 7, wherein said first and second feeding transmission gears have a diameter equal therebetween;
said second feeding transmission gear is disposed above said first feeding transmission gear, and said returning transmission gear is disposed under said first feeding transmission gear.

11. A camera as defined in claim 10, wherein said arm is disposed under said sun gear and said feeding and returning planet gears, and includes:
a first support portion for supporting said sun gear and said returning planet gear;
a second support portion for supporting said feeding planet gear; and
a rise portion having lower and upper ends, said lower end having said first support portion projecting therefrom, said upper end having said second support portion projecting therefrom, for keeping said feeding planet gear positioned higher than said returning planet gear.

12. A camera as defined in claim 4, wherein said timing belt is disposed under said roll chamber and said cassette holder chamber.

13. A camera as defined in claim 12, wherein said spool drive shaft is disposed in an upper wall of said cassette holder chamber;
further comprising a transmission mechanism, extended along a vertical wall of said cassette holder chamber, for transmitting rotation of said second timing gear to said spool drive shaft.

14. A camera as defined in claim 13, wherein said photo film cassette is IX240 type.

* * * * *